(No Model.)  2 Sheets—Sheet 1.

A. C. JORDAN.
Coal Washing Machine.

No. 231,429.  Patented Aug. 24, 1880.

Witnesses,
Jno K Smith
Jno R Hughes

Inventor,
August C. Jordan
by Bakewell & Kerr
Attorneys

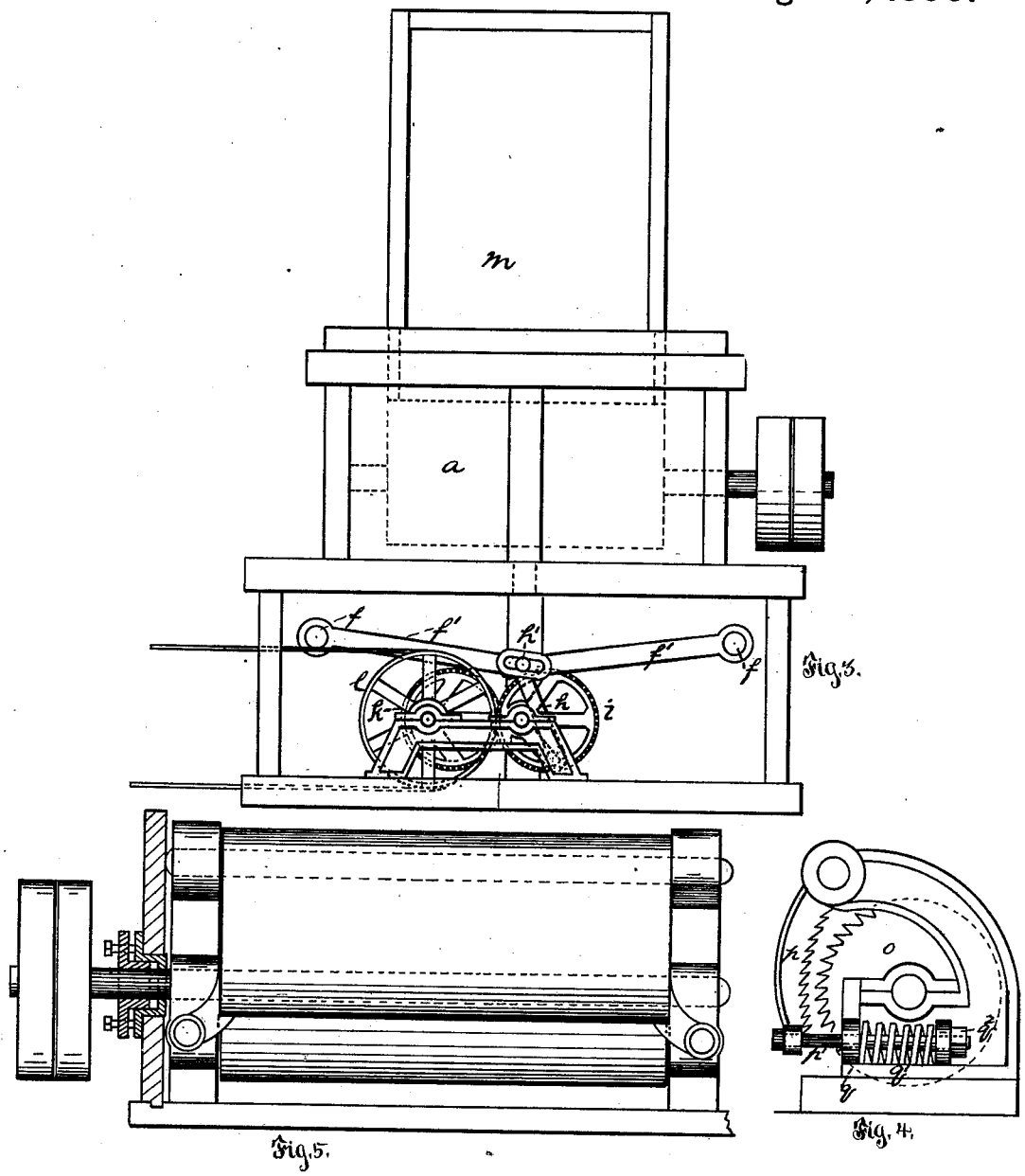

UNITED STATES PATENT OFFICE.

AUGUST C. JORDAN, OF PITTSBURG, PENNSYLVANIA, ASSIGNOR OF ONE-HALF OF HIS RIGHT TO JOHN ROBSON & SON.

COAL-WASHING MACHINE.

SPECIFICATION forming part of Letters Patent No. 231,429, dated August 24, 1880.

Application filed May 15, 1880. (No model.)

*To all whom it may concern:*

Be it known that I, AUGUST C. JORDAN, of Pittsburg, in the county of Allegheny and State of Pennsylvania, have invented a new and useful Improvement in Coal-Washing Machines; and I do hereby declare the following to be a full, clear, and exact description thereof, reference being had to the accompanying drawings, making part of this specification, in which—

Figure 1:
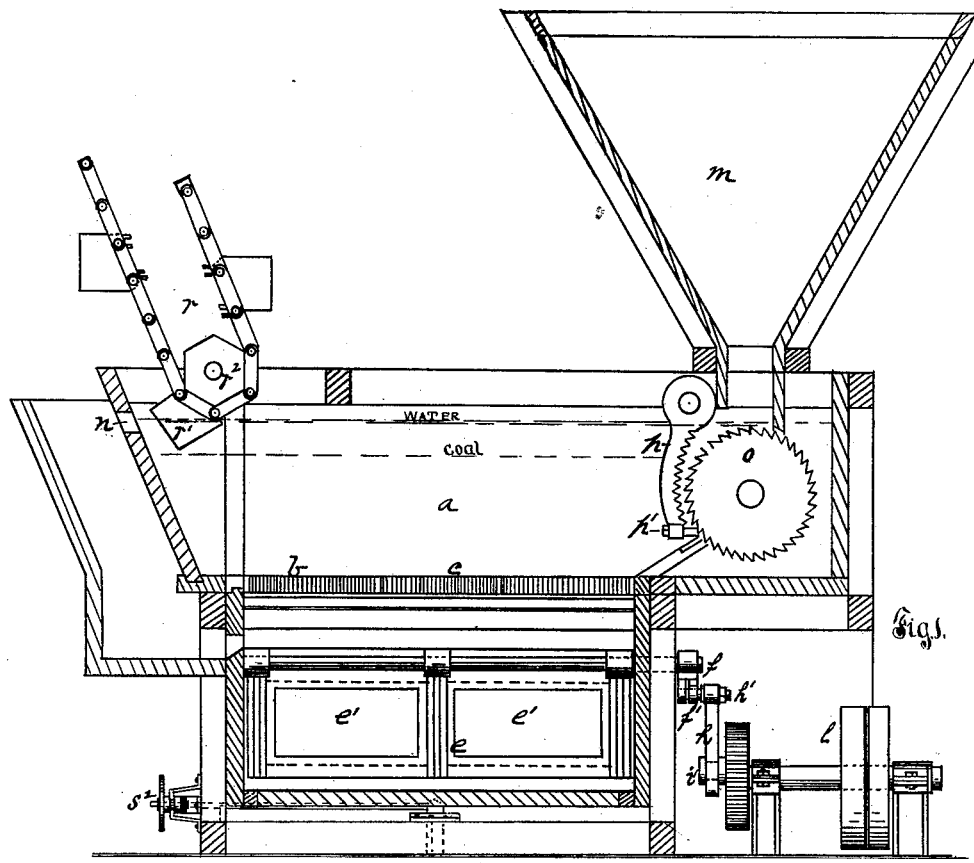
Figure 2:
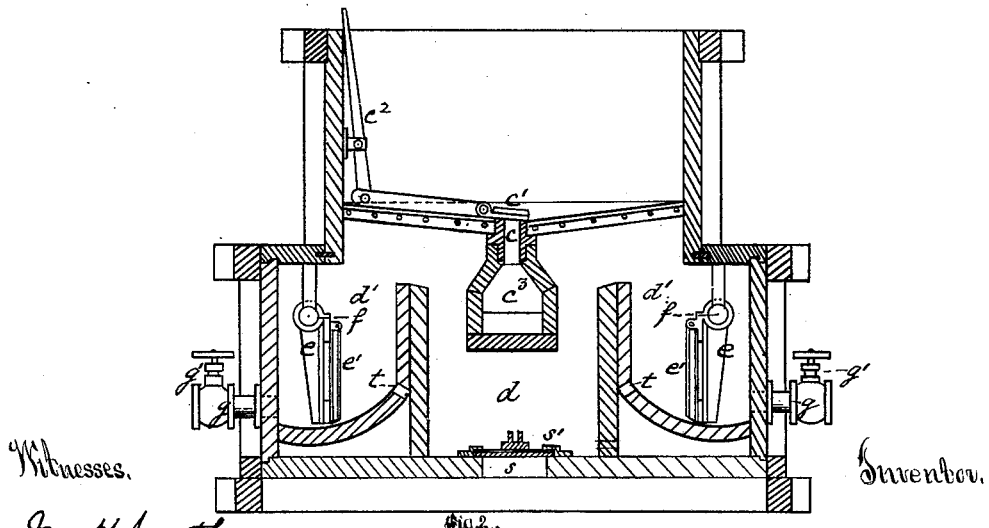

Figure 1 is a side elevation, partly in section. Fig. 2 is a vertical cross-section. Fig. 3 is an end view, and Figs. 4 and 5 are respectively section and side views of the feeding and crushing apparatus.

Like letters of reference indicate like parts in each.

My invention consists of a coal-washer in which the washing-tank is supplied with the material by means of a serrated feed-wheel arranged below the hopper and operating in connection with a serrated vertical crushing-jaw having a face converging to that of the feed-wheel, the said wheel and crushing-jaw being arranged below the level of the water in the tank; also, in which the material is removed directly from the washing-tank by means of an elevator the buckets of which dip below the surface of the water and below the level of the overflow-orifice; and also in which the pulsation is communicated to the water in the washing-tank by means of wings provided with valves arranged in compartments below the level of the screen, the said wings having a vibratory motion upon shafts, which vibratory motion, being communicated by means of eccentric gear-wheels, is rapid during the upward stroke, so as to stir up and break up the bed of coal, and decreases in velocity as the wings fall back to place.

To enable others skilled in the art to make and use my invention, I will now describe its construction and mode of operation.

The machine has a washing-tank, $a$, in the bottom of which is a screen, $b$, which inclines from both sides toward the center. At the center there is a long opening or openings, $c$, which is closed by a door or doors, $c'$, operated by means of a lever or levers, $c^2$. This opening $c$ leads down into a chamber, $c^3$, and is for the purpose of discharging into the chamber the slate and pyrites which collect in the bottom of the washing-chamber $a$.

The slate and other refuse is discharged from the chamber $c^3$ at the end of the machine.

Below the chamber $a$ is a large chamber, $d$, extending under the entire length of the screen $b$. It has a chamber, $d'$, on each side, and in each chamber $d'$ there is one or more vibrating doors or flaps, $e$, provided with valves $e'$, and mounted upon a shaft, $f$, by which a limited vibration is communicated to them.

Water is admitted to the apparatus through pipes $g$, one or more, at each side of the machine, and opening opposite to the valves $e'$. These pipes are controlled by suitable valves $g'$, to regulate the flow of the water.

The shafts $f$ are operated by means of cranks $f'$, which extend toward each other along the end of the machine, and, meeting centrally, are both mounted upon the wrist-pin $h'$ of the driving-rod $h$, which, in turn, is connected to the wrist-pin $i'$ upon the eccentric gear-wheel $i$. The eccentric gear-wheel $i$ meshes into another eccentric gear-wheel, $k$, which is driven by a pulley, $l$.

The cranks $f'$ are slotted at their inner ends, so as to allow of their free movement upon the wrist-pin $h'$. The movement of the wrist-pin $h'$ is a vertical one, and this causes the shafts $f$ to have a short oscillating movement, which movement, owing to the eccentric gear-wheels $i$ and $k$, is rapid as the shafts raise the doors $e$, and gradually diminishes in speed as it lets them fall.

The apparatus is provided with a hopper, $m$, below which, and discharging below the level of the discharge-outlet $n$, is a serrated feed-wheel, $o$.

In front of the wheel $o$ is a converging serrated jaw, $p$, held into position with relation to the feed-wheel $o$ by means of a stem, $p'$, passing through eyes at its lower corners, and then back at the ends of the case which surrounds the feed-roller $o$, through a flange, $q$, where it is supplied with a stiff spring, $q'$, held in place between the flange $q$ and the nut $q^2$. The purpose of this spring attachment to the lower end of the converging jaw $p$ is to enable it to give in case any substance falls between the grinding-surface of the feed-wheel $o$ and the jaw $p$ which is too hard to be broken thereby, and thus prevent a fracture of any of the parts of the machine. At the other end of the washing-tank $a$ is an elevator, $r$, having buckets $r'$, which turn around a pulley, $r^2$, and take their load below the level of the overflow-opening $n$.

In the bottom of chamber $d$ is an opening or openings, $s$, closed by a valve, $s'$, operated by a shaft and pinion, $s^2$, from the outside, to discharge from the chamber the fine refuse that passes through the screen $b$.

Holes $t$ are made in the valve-chamber $d'$, to permit the débris that falls into them to pass to the discharge $s$.

The operation of my improved washer is as follows: The coal is fed to the feeding-roll through the hopper $m$, which feed-roll, operating in connection with the jaw $p$, crushes and breaks up the material in the water and subjects it to action of the water. In this way it is more thoroughly cleansed by the water than it would be if crushed first and then thrown in in bulk. The oscillation of the doors $e$ makes a regular pulsation in the water, which causes the material in the tank to arrange itself in layers according to the specific gravity of the different parts, while the sudden and swift upward movement breaks up the banking of the coal, and the slower return causes it to settle gradually, which is further aided and accomplished by the fact that the valves $e'$, being held up to some extent by the inflowing of the streams of water from the pipes $g$, close still more slowly. The water entering through pipes $g$, flowing up through the loosened and descending mass in the washing-chamber $a$, on its way to the outlet $n$, loosens the coal and lighter refuse from the heavier débris and carries it up to the top, there depositing the coal and carrying the lighter refuse over the discharge.

The raising of the coal from out the washing-tank, instead of first washing it over into a settling-tank, enables me to save a quantity which otherwise would be lost, and consequently it is a more economical construction, saving both in construction and use.

The feeding-roll and crushing-jaw give a regular uniform feed of properly-sized material and prevent clogging.

This machine is very rapid in its operation and cleanses the coal thoroughly.

Instead of having two chambers, $d'$, one may be used, which may be provided with but one oscillating wing, $e$.

I am aware that in ore-washers wherein the ore and water supply are fed to the machine above the screen, and the impulse given to the tank-water by a piston or plunger, a downwardly-opening valve has been provided on the plunger in order to prevent suction on the back-stroke, and do not claim the same, as it will be at once apparent that such a valve could not be of service in a machine wherein a continuous upward current of water was one of the agencies employed, as in my machine, and wherein the valve must open away from the inflowing current of water.

What I claim as my invention, and desire to secure by Letters Patent, is—

1. In a coal-washing machine, a serrated feed-roll combined with a crushing-jaw, said parts being placed in the washing-chamber below the level of the discharge-orifice, substantially as and for the purposes described.

2. In a coal-washing machine, the combination, with a water-tank having side chambers and oscillating or vibrating doors or flaps, of a double-inclined screen and a central slate and refuse discharge, substantially as and for the purpose specified.

3. The combination, with the water-tank of a coal-washing machine, of a perforated bed or screen, a vibrating door or flap hung in the tank below the screen, said vibrating door or flap being provided with a valve, and a water induction or supply pipe or pipes located back of the vibrating valved door or flap, substantially as and for the purpose specified.

4. In a coal-washing machine, the combination, with the shaft of the oscillating or vibrating door or flap, of the cranks having slotted ends, which ends are connected to the wrist-pin of a driving-rod common to both cranks, a driving-rod common to both cranks and which is connected to and operated from an eccentric gear-wheel, an eccentric gear-wheel for actuating the driving-rod, and a second eccentric gear-wheel for imparting motion to the eccentric gear-wheel which actuates the driving-rod, substantially as and for the purpose specified.

5. The combination of the washing-tank and an elevator operating therein, which takes its load below the level of the discharge-orifice, substantially as and for the purposes described.

In testimony whereof I, the said AUGUST C. JORDAN, have hereunto set my hand.

AUGUST C. JORDAN.

Witnesses:
T. B. KERR,
J. K. SMITH.